United States Patent [19]

Nakamura et al.

[11] Patent Number: 5,470,374

[45] Date of Patent: Nov. 28, 1995

[54] METHOD FOR PRODUCTION OF MAGNETIC METAL PARTICLES AND APPARATUS THEREFOR

[75] Inventors: Hiroyuki Nakamura; Yoshinori Hama; Shuhei Arikita; Shingo Ikeshita, all of Wakayama, Japan

[73] Assignee: Kao Corporation, Tokyo, Japan

[21] Appl. No.: 118,659

[22] Filed: Sep. 10, 1993

[30] Foreign Application Priority Data

Sep. 10, 1992 [JP] Japan .................................. 4-269751
Oct. 28, 1992 [JP] Japan .................................. 4-313946

[51] Int. Cl.⁶ .................................................. B22F 9/22
[52] U.S. Cl. ............................................. 75/348; 148/105
[58] Field of Search ............................... 75/348; 148/105

[56] References Cited

U.S. PATENT DOCUMENTS

| | | | |
|---|---|---|---|
| 3,967,986 | 7/1976 | Rau et al. | 148/105 |
| 4,318,735 | 3/1982 | Mishima et al. | 148/105 |
| 4,400,337 | 8/1983 | Hayashi et al. | 264/82 |
| 4,481,253 | 11/1984 | Matsufuji et al. | 75/348 |
| 5,199,998 | 4/1983 | Klingelhoffer | 148/105 |

FOREIGN PATENT DOCUMENTS

| | | |
|---|---|---|
| 0041142 | 9/1981 | European Pat. Off. . |
| 0305069 | 3/1989 | European Pat. Off. . |
| 55-157214 | 12/1980 | Japan . |
| 59-014081 | 4/1984 | Japan . |
| 59-110701 | 6/1984 | Japan . |
| 59-197506 | 11/1984 | Japan . |
| 60-128202 | 7/1985 | Japan . |
| 60-048563 | 10/1985 | Japan . |
| 1-052442 | 11/1989 | Japan . |

OTHER PUBLICATIONS

Patent Abstracts of Japan, vol. 7, No. 217 (M–245) (1362) Sep. 27, 1983 Belt Type Reducing Furnace for Metallic Powder and Operating Method Thereof, Kokai No. 58–110601.

Patent Abstracts of Japan vol. 15, No. 437 (M–1176) Sep. 1985, Production of Magnetic Metallic Powder, Kokai No. 60–128202.

Patent Abstracts of Japan, vol. 9, No. 290 (M–430) Sep. 1991, Finish Heat Treatment Method for Iron Powder, Kokai No. 3–183701.

*Primary Examiner*—George Wyszomierski
*Attorney, Agent, or Firm*—Birch, Stewart, Kolasch & Birch

[57] ABSTRACT

The present invention is directed to a method for a continuous mass-production, on an industrial scale at a high efficiency, of magnetic metal particles having excellent magnetic properties by preventing particle deformation and mutual sintering of the particles in a reduction process, and/or by preventing deterioration of the magnetic properties and unevenness in the properties, particularly in the saturation magnetization, upon oxidation in a stabilization process. In this method, an iron compound based on iron oxyhydroxide can be thermally dehydrated in a thermal dehydration process. These processes can be conducted using apparatuses of the present invention which have a gas flow reactor; a belt conveyor being installed in the reactor and having a gass-passable belt for transporting the material; a gas dispersion plate; and a heating means.

11 Claims, 5 Drawing Sheets

METHOD FOR PRODUCTION OF MAGNETIC METAL PARTICLES AND APPARATUS THEREFOR

BACKGROUND OF THE INVENTION

1. Field of the Invention

The present invention relates to a method for a continuous production of magnetic metal particles and an apparatus therefor. More particularly, it relates to a method and apparatus for a continuous production of magnetic metal particles which are useful for magnetic recordings.

2. Discussion of the Related Art

Recent development of various recording systems has been remarkable, and among them, the advance of the reduction in size and weight of a magnetic recording/reproducing apparatus is significant. With this advance, higher performance on the magnetic recording media such as magnetic tapes and magnetic disks has been increasingly in demand.

In order to meet such demands on the magnetic recordings, magnetic particles having a high coercivity and a high saturation magnetization (us) are required. Conventionally, as the magnetic particles for magnetic recordings, acicular magnetite and maghemite or the so-called "cobalt-containing iron oxide" prepared by modifying these magnetic iron oxide particles with cobalt have been used. For the purpose of producing a higher output magnetic medium, ferromagnetic metal particles having a higher coercivity and a saturation magnetization, i.e., the so-called "magnetic metal particles," have begun to be used.

Such magnetic metal particles are usually produced by thermally reducing iron compound particles based on acicular iron oxyhydroxide or iron oxide to metallic iron in a reducing gas atmosphere such as a hydrogen gas stream. In this method, the acicular particles used as the starting material are reduced to form the so-called "skeleton particles," while retaining their original shapes. These skeleton particles comprise fine small unit particles, namely, crystallites, the small unit particles being connected to each other to form a skeletal structure. As this reduction reaction is carried out at a high temperature, particle crystallinity improves, and the saturation magnetization of the magnetic metal particles increases. However, such a high temperature reduction results in collapse of the acicular shape of skeleton particles and mutual sintering of skeleton particles, posing a problem of deterioration of the magnetic properties such as a coercivity and a squareness ratio ($\sigma r/\sigma s$) of the magnetic metal particles. To obtain magnetic metal particles of satisfactory performance, it is, therefore, necessary to solve the problem concerning how to retain the acicular shape of raw material particles in producing the desired magnetic metal particles.

Traditionally, various methods for reduction have been proposed to solve this problem, including 2) the method wherein reduction is conducted using a fluidized bed reduction furnace after granulation to pellets of 6 to 250 mesh size (Japanese Patent Laid-Open No. 174509/1983), 2) the method wherein reduction is conducted using a reactor equipped with an impeller blade (Japanese Patent Laid-Open No. 157214/1980), 3) the method wherein hydrogen reduction is conducted using a fixed bed reactor (Japanese Patent Examined Publication No. 48563/1985), 4) the method wherein hydrogen reduction is conducted using a cylindrical reduction furnace after granulation to 0.5 to 30 mm pellets (Japanese Patent Examined Publication No. 52442/1989, U.S. Pat. No. 4,400,337), and 5) the method wherein reduction is conducted using a rotary kiln after granulation to spherical pellets of 1 to 10 mm size (Japanese Patent Laid-Open No. 197506/1984).

Of these methods, reduction methods 1) and 2) have drawbacks of magnetic property deterioration due to promoted aggregation of the skeleton particles as a result of mutual contact or collision of the pellets, and dust escape from the reactor.

The fixed bed reduction methods 3) and 4) offer solutions to the above problems, but these methods have the following drawbacks: The hydrogen reduction reaction of iron oxide proceeds in two stages represented by the following formulas:

$$3Fe_2O_3 + H_2 \rightarrow 2Fe_3O_4 + H_2O \tag{1}$$

$$Fe_3O_4 + 4H_2 \rightarrow 3Fe + 4H_2O \tag{2}$$

In the fixed bed, because steam formed upon this reaction is accumulated as the raw material particle layer height (layer thickness) increases, the upper portion of the layer has a higher steam partial pressure. This steam promotes growth of the crystallites constituting the acicular skeleton particles. When the size of the crystallite is too large, the deformation of acicular shape and mutual sintering of the skeleton particles take place. Thus, as the layer height increases, the magnetic properties of the obtained particles are deteriorated. In addition, because reaction (2) is reversible, as the layer height increases, the reduction reaction rate decreases under more influence of the steam formed, resulting in uneven reduction. Although uniform magnetic metal particles of excellent magnetic properties can be obtained by lowering the ratio of the layer height to the tower diameter of the fixed bed, such fixed bed batch-wise reduction is unsuitable for industrial application because of very poor productivity.

In reduction method 5), contact between a reducing gas and a material to be reduced is insufficient because the reducing gas flows above the material layer, so that reduction time is longer than in methods 1) through 3). This poses a problem of tendency toward morphological change in acicular skeleton particles and mutual sintering of the particles.

There is, therefore, a need for the development of a method and apparatus for a continuous mass-production, on an industrial scale at a high efficiency, of the magnetic metal particles of excellent magnetic properties by preventing morphological changes in particles and mutual sintering of the particles in producing such fine magnetic metal particles.

Also, the magnetic metal particles obtained via such a reduction process are chemically unstable, undergoing oxidation in air, thus having a drawback of magnetic property deterioration with time. To overcome this drawback, various attempts, with proposals of various methods, have been made to stabilize the magnetic metal particles obtained by a thermal reduction as described above by further forming an oxidized layer on the surface thereof.

A conventional method for stabilization of the magnetic metal particles is the so-called liquid phase oxidation (e.g., Japanese Patent Laid-Open No. 128202/1985), in which the magnetic metal particles to be stabilized are suspended in a solvent, and an oxidizing gas is sparged into the suspension. However, this method has drawbacks such as adverse effect of oxidized solvent on coating and solvent handling safety assurance. Another method is the so-called gas-phase oxidation (e.g., Japanese Patent Examined Publication No. 14081/1984), in which an oxidized layer is formed by using a gas of adjusted oxygen partial pressure in a gas phase. At present, this gas-phase oxidation method is common.

In such gas-phase oxidation, a fluidized bed, which offers good contact between gas and solid is often used (e.g., Japanese Patent Examined Publication No. 14081/1984 and Japanese Patent Laid-Open Nos. 110701/1984 and 192103/1990). However, the gas-phase oxidation method using a fluidized bed has the drawbacks of magnetic property deterioration due to promoted aggregation of particles as a result of mutual contact or collision of pellets, and dust escape from the reactor.

On the other hand, if a gas-phase oxidation is possible in a stationary state of the magnetic metal particles to be stabilized, i.e., in a fixed bed, the above drawbacks can be overcome. However, this method for stabilization has the following drawbacks: The saturation magnetization ($\sigma s$) of the magnetic metal particles decreases upon gas-phase oxidation, the degree of this decrease depending solely on gas-phase oxidation temperature. When a gas-phase oxidation is conducted by using a fixed bed, the heat of reaction generated by the oxidation reaction accumulates locally to heat only the portion to a high temperature, resulting in excessive decrease of saturation magnetization, and a non-oxidized portion is formed due to gas flow channelling. As a result, the obtained magnetic metal particles display a very wide fluctuation in the saturation magnetization. In some cases, upon exposure to the atmosphere, the non-oxidized portion becomes hot or ignites by a rapid oxidation reaction, which may significantly impair the essential coercivity and saturation magnetization. Moreover, such local accumulation of the heat of reaction and gas flow channellings are more likely to take place as the layer height on the fixed bed increases. For this reason, the magnetic metal particles having a uniform oxidized layer can be obtained by lowering the ratio of the layer height to the tower diameter of the fixed bed. However, such a fixed bed batch-wise gas-phase oxidation is unsuitable for industrial application because of very poor productivity.

Accordingly, there is a need for the development of a method and apparatus for a continuous mass-production, on an industrial scale at a high efficiency, of magnetic metal particles which have a uniform oxidized layer and are free from deterioration of the magnetic properties and unevenness in the properties, particularly in the saturation magnetization, upon stabilization by a gas-phase oxidation.

SUMMARY OF THE INVENTION

The first object of the present invention is to provide a method for a continuous mass-production, on an industrial scale at a high efficiency, of magnetic metal particles of excellent magnetic properties, by preventing particle deformation and mutual sintering of the particles in a reduction process for the production of the magnetic metal particles.

The second object of the present invention is to provide an apparatus which is suitably used for the reduction process to achieve the first object.

The third object of the present invention is to provide a method for a continuous mass-production, on an industrial scale at a high efficiency, of magnetic metal particles having a uniform oxidized layer and excellent magnetic properties, by preventing deterioration of the magnetic properties and unevenness in the properties, particularly in the saturation magnetization, upon oxidation in a stabilization process for the production of magnetic metal particles.

The fourth object of the present invention is to provide an apparatus which is suitably used for the stabilization process to achieve the third object.

The fifth object of the present invention is to provide a method for a continuous mass-production, on an industrial scale at a high efficiency, of magnetic metal particles having a uniform oxidized layer and excellent magnetic properties, by preventing particle deformation and mutual sintering of the particles in a reduction process, and by further preventing deterioration of the magnetic properties and unevenness in the properties, particularly in the saturation magnetization, upon oxidation in a stabilization process for the production of magnetic metal particles.

The sixth object of the present invention is to provide an apparatus which is used for the production of magnetic metal particles to achieve the fifth object.

The seventh object of the present invention is to provide a method for a continuous mass-production, on an industrial scale at a high efficiency, of magnetic metal particles having a uniform oxidized layer and excellent magnetic properties, by thermally dehydrating an iron compound based on iron oxyhydroxide in a thermal dehydration process, by preventing particle deformation and mutual sintering of the particles in a reduction process, and by further preventing deterioration of the magnetic properties and unevenness in the properties, particularly in the saturation magnetization, upon oxidation in a stabilization process for the production of magnetic metal particles.

The eighth object of the present invention is to provide an apparatus which is used for the production of magnetic metal particles to achieve the seventh object.

The inventors of the present invention have worked to achieve the above objects, and they have found that magnetic metal particles of excellent magnetic properties which are free from particle deformation and mutual sintering of the particles can be continuously produced on an industrial scale and at a high efficiency by conducting a reduction reaction in a gas flow reactor equipped with a gas-passable belt, and they have further found that magnetic metal particles of excellent magnetic properties having a uniform oxidized layer can be continuously produced on an industrial scale at a high efficiency by conducting a thermal gas-phase oxidation in a stabilization process by using the same gas flow reactor with a gas-passable belt as used in the reduction process. Based upon the above findings, the present invention has been completed.

The present invention essentially relates to:
(1) A method for producing magnetic metal particles, wherein iron compound particles based on iron oxyhydroxide or iron oxide are thermally reduced with a reducing gas, comprising the steps of continuously supplying a granulated material to be reduced onto a gas-passable belt installed in a gas flow reactor; and continuously conducting a thermal reduction with the reducing gas while conveying the granulated material.
(2) An apparatus used in a reduction process for the production of magnetic metal particles, comprising a gas flow reactor having an inlet and an outlet for a reducing gas, an inlet for a material to be reduced, and an outlet for a reduced material; a belt conveyor being installed in the reactor and having a gas-passable belt for transporting the material to be reduced; a gas dispersion plate for uniformly dispersing and supplying the reducing gas introduced via the reducing gas inlet to the surface of the belt on which the material to be reduced is placed; and a heating means arranged to heat the inside of the reactor.
(3) A method for producing magnetic metal particles which includes a stabilization process, wherein the magnetic metal particles based on iron are stabilized by a thermal gas-phase oxidation with an oxygen-containing gas, the stabilization process comprising the steps of continuously supplying a granulated material to be stabilized onto a gas-passable belt installed in a gas flow reactor; and continuously stabilizing the material to be stabilized by the thermal gas-phase oxidation with the oxygen-containing gas while conveying the granulated material to be stabilized.

(4) An apparatus used in a stabilization process for the production of magnetic metal particles, comprising a gas flow reactor having an inlet and outlet for an oxygen-containing gas, an inlet for a material to be stabilized and an outlet for a stabilized material; a belt conveyor being installed in the reactor and having a gas-passable belt for transporting the material to be stabilized; a gas dispersion plate for uniformly dispersing and supplying the oxygen-containing gas introduced via the oxygen-containing gas inlet to the surface of the belt on which the material to be stabilized is placed; and a heating means arranged to heat the inside of the reactor.

(5) A method for producing magnetic metal particles, wherein iron compound particles based on iron oxyhydroxide or iron oxide are thermally reduced with a reducing gas, and then stabilized by a thermal gas-phase oxidation with an oxygen-containing gas, comprising the following steps (a) and (b):

(a) continuously obtaining a reduced material by continuously supplying a granulated material to be reduced onto a gas-passable belt installed in a gas flow reactor for a thermal reduction, and continuously conducting the thermal reduction with the reducing gas while conveying the granulated material to be reduced; and (b) continuously stabilizing the reduced material (a granulated material to be stabilized) obtained in step (a) by continuously supplying the granulated material to be stabilized onto a gas-passable belt installed in a gas flow reactor for stabilization, and continuously conducting the thermal gas-phase oxidation with the oxygen-containing gas while conveying the granulated material to be stabilized.

(6) A production apparatus for magnetic metal particles, comprising the following apparatus (a) used in a reduction process and apparatus (b) used in a stabilization process, which are serially connected with each other:

(a) the apparatus used in the reduction process, comprising a gas flow reactor for a thermal reduction having an inlet and outlet for a reducing gas, an inlet for a material to be reduced and outlet for a reduced material; a belt conveyor being installed in the reactor and having a gas-passable belt for transporting the material to be reduced; a gas dispersion plate for uniformly dispersing and supplying the reducing gas introduced via the reducing gas inlet to the surface of the belt on which the material to be reduced is placed; and a heating means arranged to heat the inside of the reactor; and (b) the apparatus used in the stabilization process, comprising a gas flow reactor having an inlet and outlet for an oxygen-containing gas, an inlet for a material to be stabilized, and an outlet for a stabilized material; a belt conveyor being installed in the reactor and having a gas-passable belt for transporting the material to be stabilized; a gas dispersion plate for uniformly dispersing and supplying the oxygen-containing gas introduced via the oxygen-containing gas inlet to the surface of the belt on which the material to be stabilized is placed; and a heating means arranged to heat the inside of the reactor.

(7) A method for producing magnetic metal particles, wherein iron compound particles based on iron oxyhydroxide are thermally dehydrated with a non-reducing gas, then thermally reduced with a reducing gas, and further stabilized by a thermal gas-phase oxidation with an oxygen-containing gas, comprising the following steps (a)–(c):

(a) continuously supplying a granulated material of the iron compound particles based on iron oxyhydroxide, which have a weight-average size of 1 to 20 mm, onto a gas-passable belt installed in a gas flow reactor for a thermal dehydration; and continuously conducting the thermal dehydration with the non-reducing gas while conveying the granulated material to continuously yield a thermally dehydrated material;

(b) continuously supplying the thermally dehydrated material obtained in step (a) onto a gas-passable belt installed in a gas flow reactor for a thermal reduction; and continuously conducting the thermal reduction with the reducing gas while conveying the material to continuously yield a reduced material; and (c) continuously supplying the reduced material obtained in step (b) onto a gas-passable belt installed in a gas flow reactor for stabilization; and continuously stabilizing the material by a thermal gas-phase oxidation with the oxygen-containing gas while conveying the material.

(8) A production apparatus for magnetic metal particles, comprising a thermal dehydration apparatus (a) wherein a granulated material of iron compound particles based on iron oxyhydroxide is thermally dehydrated; a thermal reduction apparatus (b) wherein the thermally dehydrated material obtained by the thermal dehydration apparatus (a) is thermally reduced; and a thermal gas-phase oxidation apparatus (c) wherein the thermally reduced material obtained by the thermal reduction apparatus (b) is stabilized by a thermal gas-phase oxidation.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

Figure 1:
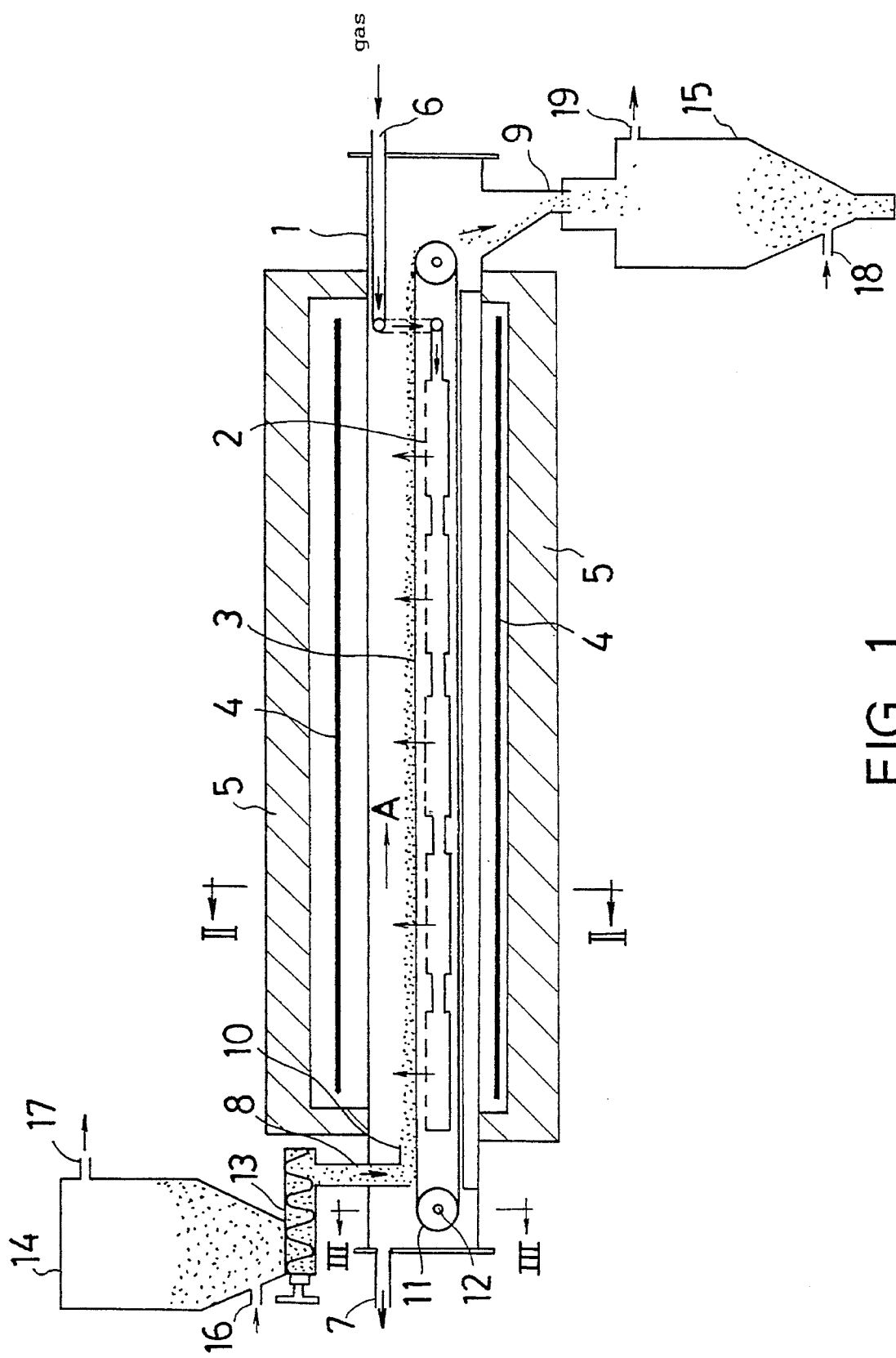
FIG. 1 is a longitudinal sectional view of an example of the production apparatus of the present invention.

The reference numerals in FIGS. 1 through 6 denote the following elements:

Element 1 is a reactor, element 2 a gas dispersion plate, element 3 a belt, element 4 an electric heater, element 5 a heat insulating material, element 6 an inlet for a gas (a reducing gas, an oxygen-containing gas or a non-reducing gas), element 7 an outlet for a gas (a reducing gas, an oxygen-containing gas or a non-reducing gas), element 8 an inlet for a material to be treated (a material to be reduced, a material to be stabilized or a material to be dehydrated), element 9 an outlet for a treated material (a reduced material, a stabilized material or a dehydrated material), element 10 a thickness adjusting plate, element 11 a belt-driving roller, element 12 a roller driving shaft, element 13 a material feeder, element 14 a material hopper, element 15 a product hopper, element 16 an inlet for a nitrogen purge gas, element 17 an outlet for a nitrogen purge gas, element 18 an inlet for a nitrogen purge gas, element 19 an outlet for a nitrogen purge gas, element 20 a shaft seal, element 21 a driving motor, element 22 a gas sealing wall, element 40 a reactor, element 41 a belt conveyor, element 42 a gas dispersion plate, element 43 a heating means, element 44 an inlet for a gas (a reducing gas, an oxygen-containing gas or a non-reducing gas), element 45 an outlet for a gas (a reducing gas, an oxygen-containing gas or a non-reducing gas), element 46 an inlet for a material to be treated (a material to be reduced, a material to be stabilized or a material to be dehydrated), element 47 an outlet for a treated material (a reduced material, a stabilized material or a dehydrated material), element 51 a thermal dehydration reactor, element 52 a thermal reduction reactor, element 53 a thermal gas-phase oxidation reactor, element 54 a material hopper (hopper for a granulated raw material), element 55 a material feeder, element 56 a product hopper (hopper for a dehydrated material), element 57 a material hopper (hopper for a dehydrated material), element 58 a material feeder, element 59 a product hopper (hopper for a reduced material), element 60 a material hopper (hopper for a reduced material), element 61 a material feeder, element 62 a product hopper (hopper for a stabilized material), element 63 a material supply valve, element 64 a material supply valve, element 65 a non-reducing gas inlet, element 66 a non-reducing gas outlet, element 67 a reducing gas inlet, element 68 a reducing gas outlet, element 69 an oxygen-containing gas inlet, element 70 an oxygen-containing gas outlet, element 71 an inlet for a material to be dehydrated, element 72 an outlet for a dehydrated material, element 73 an inlet for a material to be reduced, element 74 an outlet for a reduced material, element 75 an inlet for a material to be stabilized, element 76 an outlet for a stabilized material (product), element 77 an inlet for a nitrogen purge gas, and element 78 an outlet for a nitrogen purge gas.

DETAILED DESCRIPTION OF THE INVENTION

Figure 4:
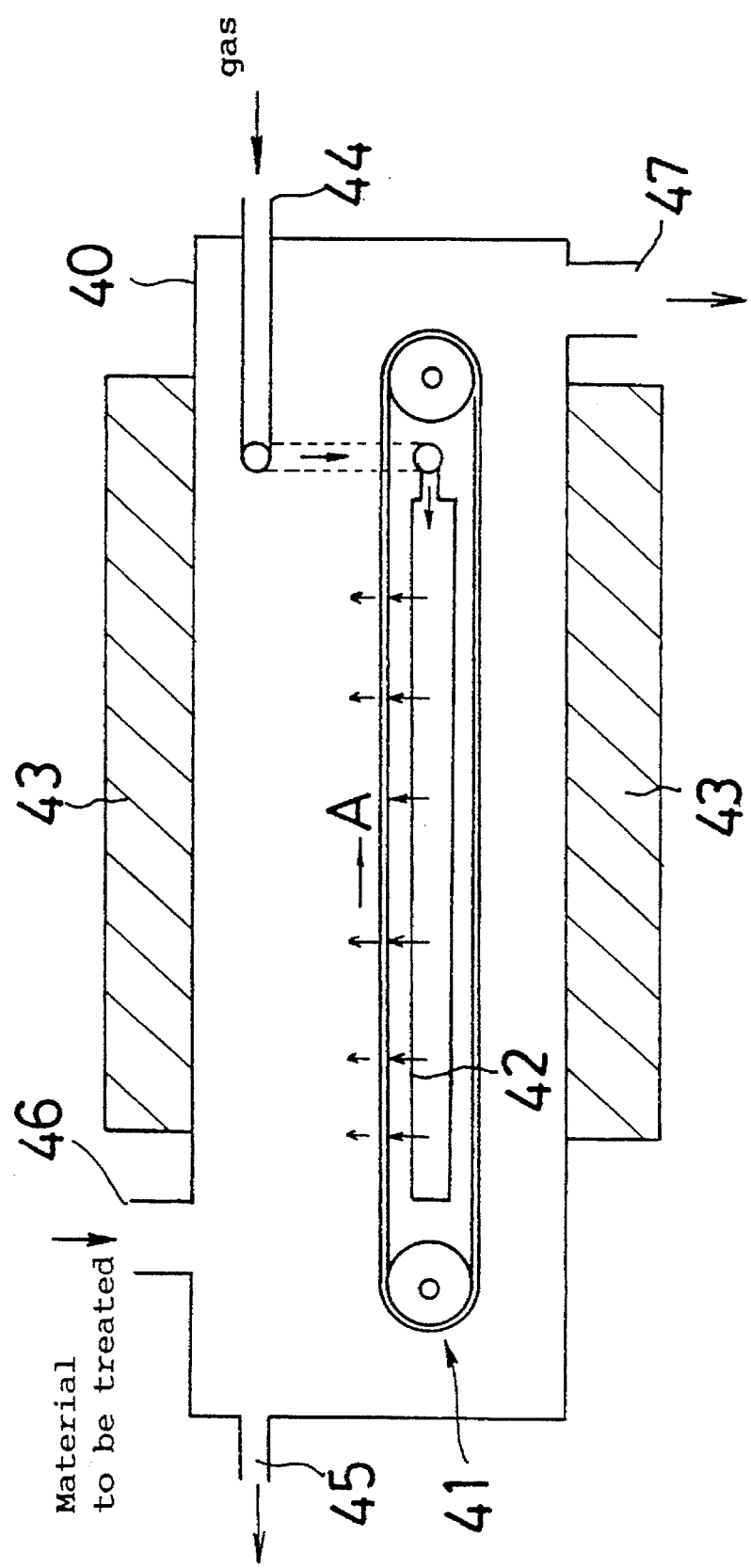
FIG. 4 is a schematic view of the production apparatus of the present invention.

In one embodiment of the present invention, the apparatus used in the reduction process for the production of magnetic metal particles is hereinafter described with reference to FIG. 4, which is a schematic view thereof.

A reactor 40 is a closed horizontal vessel having an inlet 44 for a reducing gas, an outlet 45 for a reducing gas, an inlet 46 for a material to be reduced and an outlet 47 for a reduced material. A heating means 43 is provided around the reactor 40.

Any heating means can be used without limitation, as long as it is capable of heating the material to be reduced to a reduction temperature. For example, combustion furnace type and electronic furnace type can be used. In the present invention, heat insulation is given by means of a heat insulating material, etc. for keeping the reduction temperature in the reactor 40 constant.

The reactor has a belt conveyor 41 for transporting the granulated material to be reduced. Any type of belt can be used without limitation, as long as it is, for example, a gas-passable endless belt having an aperture size such that the granulated material to be reduced can be retained, and having an opening ratio such that reducing gas pressure drop can be diminished while it flows through apertures of the belt. Such belts include mesh belts and perforated plate belts. In the present invention, in order to retain the material to be reduced on a gas-passable belt, namely, to prevent the material from being fluidized on the belt by gas flow and coming in contact with each other, and further to prevent the material from being scattered, pellets larger in size than the iron compound particles to be reduced, i.e., pellets to be reduced prepared by granulation of the iron compound particles (hereinafter also referred to as "granulated material to be reduced") are used.

The drive for moving the belt is not subject to limitation, with a preference given to a motor whose revolution speed is variable.

The reactor has therein a gas dispersion plate 42 for uniformly dispersing and supplying the reducing gas introduced via the reducing gas inlet 44 to the above-described belt surface on which the granulated material to be reduced is placed. The gas dispersion plate may have various forms, including a perforated plate, a sintered metal plate, and those of a wire mesh type and a cap type. Although the gas dispersion plate may be arranged above an upper side belt on which the granulated material to be reduced is placed or under a lower side belt, it is preferable to arrange it between the upper side belt surface on which the granulated material to be reduced is placed and the lower side belt surface, as illustrated in FIG. 4, since gas sealing is easy. In this case, a single gas dispersion plate may be arranged according to the effective reduction length of the belt, or several gas dispersion plates may be serially arranged in the direction of belt running. The reducing gas is preferably supplied to a gas dispersion plate 42 by using, for example, a blower having a discharge pressure higher than the pressure drop upon gas flow through the gas dispersion plate, the belt, and the granulated material layer to be reduced, etc.

The production apparatus for the reduction process of the present invention is preferably equipped with an appropriate gas seal structure to ensure effective flow of the reducing gas coming from the gas dispersion plate through the belt surface without flowing along the sides (edges) of the belt. Such structures include the structure wherein a seal wall is arranged on the sides of the gas dispersion plate and the belt and the structure wherein the sides of the gas dispersion plate and the belt and the side wall of the reactor are directly contacted.

Next, the reduction process in the method for the production of magnetic metal particles using such an apparatus is hereinafter described.

The reduction process in the present invention is characterized as a process for thermally reducing iron compound particles based on iron oxyhydroxide or iron oxide to magnetic metal particles based on metallic iron with a reducing gas, wherein the granulated material to be reduced is continuously supplied onto a gas-passable belt, and the material being transported is continuously thermally reduced by flowing the reducing gas.

This process is hereinafter described with reference to FIG. 4. The reducing gas is introduced via the inlet 44 for a reducing gas. It is then dispersed and supplied from the gas dispersion plate 42 to the surface of the gas-passable belt, passes through apertures in the belt, and is discharged from the outlet 45. While flowing the reducing gas through the belt as above, the inside of the reactor 40 is heated at a given reduction temperature by a heating means 43. Also, the reducing gas introduced via the inlet 44 for a reducing gas may be heated by an external heat exchanger (not illustrated), etc. On the other hand, the granulated material to be reduced is continuously supplied onto the belt via the inlet 46 for a material to be reduced, and while transporting the material in the direction of arrow A in FIG. 4 by means of the belt conveyor 41, the reducing gas is passed through the material layer to be reduced to conduct a continuous thermal reduction. The obtained reduced material is recovered via the outlet 47 for a reduced material.

The material to be reduced for the present invention is iron compound particles based on iron oxyhydroxide or iron oxide. Specifically, the iron compound particles comprise predominantly iron oxyhydroxide or iron oxide. The iron oxyhydroxides include $\alpha$-FeOOH, $\beta$-FeOOH and $\gamma$-FeOOH. The iron oxides include $\alpha$-Fe$_2$O$_3$, $\gamma$-Fe$_2$O$_3$ and Fe$_3$O$_4$. These iron oxyhydroxides and iron oxides may be supplemented with elements such as cobalt, zinc, copper, chromium, nickel, silicon, aluminum, tin and titanium. The material to be reduced is not subject to morphological limitation, as long as it is acicular. Specifically, forms of strips, spindles, fusiform particles, rice grains, etc. are acceptable. When using fine particles of aciculae having a length of not longer than 0.3 µm and an axial ratio of not lower than 5, in particular, the effect of the present invention is enhanced.

In the present invention, for the above-described reasons, etc., such a material to be reduced is granulated and used as a granulated material to be reduced. In this case, although the granulated material is not subject to morphological limitation, it is preferable to use pellets having a weight-average size of not smaller than 1 mm and not greater than 20 mm. The granulated materials of less than 1 mm become fluidized, resulting in dust formation or escaping from the belt when the reducing gas is brought into contact with the granulated material at a preferred gas flow rate. The granulated materials exceeding 20 mm cause poor diffusion of a hydrogen gas and a steam formed in the granulated material, leading to an uneven reduction.

Known methods for granulation are used to granulate the material to be used, including tumbling granulation, fluidizing granulation, extruding granulation and disintegration granulation.

Reducing gases which can be used include a pure hydrogen gas, a CO gas and their mixtures with inert components, with a preference given to the pure hydrogen gas.

Varying depending on the size of the granulated material to be reduced, the gas flow rate is preferably not lower than 10 cm/sec, more preferably not lower than 30 cm/sec, and still more preferably not lower than 50 cm/sec as of a linear gas velocity in the ascending direction at a right angle to the belt surface. The linear gas velocity is as obtained at the reduction temperature. When the linear gas velocity is lower than 10 cm/sec, the partial pressure of the steam formed upon the reducing reaction increases, and the size of the crystallite constituting the acicular skeleton particles becomes too large, resulting in deformation of aciculae and mutual sintering of the skeleton particles, and the magnetic properties of the obtained magnetic metal particles are deteriorated.

The layer thickness of these granulated materials to be reduced on the belt is normally not greater than 25 cm, preferably not greater than 20 cm. The excess layer thicknesses are undesirable because the size of the crystallite of the magnetic metal particles in the upper portion of the layer becomes too large and the magnetic properties are deteriorated, due to a reduction of the upper portion with a hydrogen gas containing more steam formed in the lower portion of the layer. Excess layer thicknesses are undesirable also because the reduction rate in the upper portion of the layer decreases, resulting in an uneven reduction. This is because when the layer thickness exceeds 25 cm, the effect of the steam partial pressure on the upper portion of the layer becomes innegligible even when the linear hydrogen gas velocity is increased above 10 cm/sec as described above.

The reduction temperature is preferably 300° to 700° C., more preferably 350° to 600° C. The reduction temperatures of under 300° C. are undesirable because any reduced material with excellent magnetic properties for magnetic metal particles is not obtained. The reduction temperatures exceeding 700° C. are undesirable because the acicular shape of the skeleton particles collapses, resulting in deteriorated magnetic properties.

A retention time in the reactor, i.e., the time (reduction time) from supply of the granulated material to be reduced onto the belt in the reactor to exit of the reduced material from the outlet, is normally 0.5 to 10 hours, preferably 1 to 8 hours, depending on the above various conditions. The reduction times of shorter than 0.5 hours and those of longer than 10 hours are undesirable because the reduction is insufficient in the former case, and because production efficiency is low, though there is no problem in magnetic metal particle quality, in the latter case. This retention time can be adjusted by changing the belt running speed by controlling the driving motor, etc.

By the use of the reduction process of the present invention, the magnetic metal particles of excellent magnetic properties can be continuously mass-produced on an industrial scale at a high efficiency, while preventing particle deformation and mutual sintering of particles during the production process.

The magnetic metal particles thus obtained are preferably stabilized by a surface oxidation by conventional methods. This can be achieved by, for example, immersing the magnetic metal particles in toluene and then air-drying them in the atmosphere. In the present invention, in particular, it is preferable to conduct a stabilization process by a thermal gas-phase oxidation as described below.

The apparatus used in the stabilization process for the production of magnetic metal particles is hereinafter described with reference to FIG. 4, which is used to describe the reduction process above. Accordingly, the apparatus exemplified herein can be structurally the same kind as that used in the above-described reduction process. In the stabilization process, an oxygen-containing gas is used in place of a reducing gas. The examples specified above may, therefore, serve as preferable examples of the following various elements.

A reactor 40 is a closed horizontal vessel having an inlet 44 for an oxygen-containing gas, an outlet 45 for an oxygen-containing gas, an inlet 46 for a material to be stabilized and an outlet 47 for a stabilized material. A heating means 43 is provided around the reactor.

As in the apparatus for the reduction process, any heating means can be used without limitation, as long as it is capable of heating the material to be stabilized to a thermal gas-phase oxidation temperature. For example, those of a combustion furnace type, an electronic furnace type or a jacket type can be used. In the present invention, heat insulation is given by means of a heat insulating material, etc. for keeping the temperature for the thermal gas-phase oxidation in the reactor 40 constant.

The reactor has a belt conveyor 41 for transporting the material to be stabilized. As in the apparatus for the reduction process, any type of belt can be used without limitation, as long as it is, for example, a gas-passable endless belt having an aperture size such that the granulated material to be stabilized can be retained, and having an opening ratio such that oxygen-containing gas pressure drop can be diminished while it flows through apertures of the belt. Such belts include mesh belts and perforated plate belts. In the present invention, as in the reduction process, in order to retain the material to be stabilized on a gas-passable belt, namely, to prevent the material from being fluidized on the belt by gas flow and coming in contact with each other and further to prevent the material to be stabilized from being scattered, it is preferable to use the magnetic metal particles to be stabilized in the form of granulated pellets (hereinafter also referred to as granulated material to be stabilized).

As in the apparatus for the reduction process, the drive for moving the belt is not subject to limitation, with a preference given to a motor whose revolution speed is variable.

The reactor has therein a gas dispersion plate 42 for uniformly dispersing and supplying the oxygen-containing gas introduced through the inlet 44 for an oxygen-containing gas to the above-described belt surface on which the granulated material to be stabilized is placed. As in the apparatus for the reduction process, the gas dispersion plate may have various forms, including a perforated plate, a sintered metal plate, those of a wire mesh type and a cap type. Although the gas dispersion plate may be arranged above an upper side belt on which the granulated material to be stabilized is placed or under a lower side belt, it is preferable to arrange it between the upper side belt surface on which the granulated material to be stabilized is placed and the lower side belt surface, as illustrated in FIG. 4, since a gas sealing is easy. In this case, a single gas dispersion plate may be arranged according to the effective gas oxidation reaction length of the belt, or several gas dispersion plates may be serially arranged in the direction of belt running. The oxygen-containing gas is supplied to a gas dispersion plate 42 preferably by using, for example, a blower having a discharge pressure higher than the pressure drop upon gas flow through the gas dispersion plate, the belt, the granulated material layer to be stabilized, etc.

The apparatus for the stabilization process of the present invention is preferably equipped with an appropriate gas seal structure to ensure effective flow of the oxygen-containing gas coming from the gas dispersion plate through the belt surface without flowing along the sides (edges) of the belt. As in the apparatus for the reduction process, such structures include the structure wherein a seal wall is arranged on the sides of the gas dispersion plate and the belt and the structure wherein the sides of the gas dispersion plate and the belt and the side wall of the reactor are closely contacted.

Next, the stabilization process in the method for the production of magnetic metal particles using such an apparatus is hereinafter described.

The stabilization process in the present invention is characterized as a process for stabilizing the magnetic metal particles based on metallic iron by the thermal gas-phase oxidation with the oxygen-containing gas, wherein the granulated material to be stabilized is continuously supplied onto a gas-passable belt installed in a gas flow reactor, and the material being transported is continuously stabilized by the thermal gas-phase oxidation with the oxygen-containing gas.

This process is hereinafter described with reference to FIG. 4. The oxygen-containing gas is introduced via the inlet 44 for an oxygen-containing gas. It is then dispersed and supplied from the gas dispersion plate 42 to the surface of the gas-passable belt, passes through apertures in the belt, and is discharged from the outlet 45. While flowing the oxygen-containing gas through the belt as above, the inside of the reactor 40 is heated at a given temperature for the thermal gas-phase oxidation by a heating means 43. Also, the oxygen-containing gas introduced through the inlet 44 for a gas may be heated by an external heat exchanger (not illustrated), etc. On the other hand, the granulated material to be stabilized is continuously supplied onto the belt via the inlet 46 for a material to be stabilized and while transporting the granulated material in the direction of arrow A in FIG. 4 by means of the belt conveyor 41, the oxygen-containing gas is passed through the material layer to be stabilized to conduct a stabilization by the thermal gas-phase oxidation continuously. The obtained stabilized material is recovered through the outlet 47 for a stabilized material.

Although not particularly limitative, the material to be stabilized for the present invention is usually prepared by a thermal reduction using iron compound particles based on iron oxyhydroxide or iron oxide as the starting material. As in the case of the material to be reduced mentioned above, the iron compound particles based on iron oxyhydroxide or iron oxide are not subject to morphological limitation, as long as they are in the acicular shape. Specifically, forms of strips, spindles, fusiform particles, rice grains, etc. are acceptable. When using acicular fine particles having a length of not longer than 0.3 μm and an axial ratio of not lower than 5, in particular, the effect of the present invention is enhanced.

In the stabilization process of the present invention, the material to be stabilized (magnetic metal particles to be stabilized) prepared by the thermal reduction of the above iron compound particles is oxidized by the thermal gas-phase oxidation with an oxygen-containing gas to form an oxidized layer on the surface of the material particles. The method for the thermal reduction is not subject to limitation, and any known method can be used, with a preference given to the reduction process as employed in the present invention.

In the present invention, for the above-described reasons, etc., such a material to be stabilized is granulated and used as a granulated material. In this case, although the granulated material to be stabilized is not subject to morphological limitation, it is preferable to use the granulated material having a weight-average size of not smaller than 1 mm and not greater than 20 mm as in the reduction process mentioned above. The granulated materials of less than 1 mm are likely to become fluidized, resulting in dust formation or escaping from the belt when the oxygen-containing gas is brought into contact with the granulated material at a preferred gas flow rate. The granulated materials exceeding 20 mm cause poor diffusion of oxygen-containing gas in the granulated material, leading to an uneven formation of an oxidized layer.

Known methods for granulation are used to granulate the material to be stabilized, including tumbling granulation, fluidizing granulation, extruding granulation and disintegration granulation.

The oxygen-containing gas for the present invention may be a mixed gas of oxygen or air with an inert gas. An inert gas is defined as a gas which has substantially no reactivity with the magnetic metal particles under the contact treatment conditions, and is exemplified by $N_2$, He, Ne, Ar and $CO_2$, which may be used singly or in combination. The oxygen concentration in the mixed gas is preferably not lower than 100 ppm and not higher than 2500 ppm, more preferably not lower than 150 ppm and not higher than 2000 ppm. The oxygen concentrations in the mixed gas of under 100 ppm are industrially undesirable because of a long time requirement for the stabilization treatment. Oxygen concentrations exceeding 2500 ppm are undesirable because a drastic oxidation occurs, resulting in an increased reaction temperature and hampering retention of a constant reaction temperature.

Depending on the size of the granulated material to be stabilized, the gas flow rate is preferably not lower than 5 cm/sec, more preferably not lower than 10 cm/sec, and still more preferably not lower than 15 cm/sec and not higher than 100 cm/sec, as of a linear gas velocity in the ascending direction at a right angle to the belt surface. The linear gas velocity is obtained at a thermal gas-phase oxidation temperature. When the linear gas velocity is lower than 5 cm/sec, it is difficult to maintain a constant reaction temperature because of the decreased effect of a gas stream to remove a heat of reaction, so that the heat of reaction is locally accumulated to produce a partially hot portion, which may lead to excess reduction in saturation magnetization. Also, gas flow channellings become likely so that non-oxidized portions may occur. As a result, the magnetic metal particles obtained undesirably display very wide fluctuation in the saturation magnetization. In some cases, upon exposure to the atmosphere, the non-oxidized portions can become hot or ignite by a rapid oxidizing reaction, which may lead to significant loss of the essential coercivity and saturation magnetization.

The layer thickness of the granulated material to be stabilized on the belt is normally not greater than 30 cm, preferably not greater than 25 cm. This is because the layer thicknesses exceeding 30 cm may result in an uneven formation of an oxidized layer due to local accumulation of the heat of reaction and gas flow channellings even when the linear velocity of the oxygen-containing gas is increased above 5 cm/sec as described above.

The thermal gas-phase oxidation temperature is preferably not lower than 40° C. and not higher than 150° C., more preferably not lower than 50° C. and not higher than 130° C., and still more preferably not lower than 50° C. and not higher than 100° C. The thermal gas-phase oxidation temperatures of under 40° C. result in insufficient surface oxidation, and the oxidized material ignites upon exposure to the atmosphere. The thermal gas-phase oxidation temperatures exceeding 150° C. are undesirable because excess surface oxidation hampers to obtain a high saturation magnetization. Also, because the saturation magnetization of the magnetic metal particles after stabilization by the thermal gas-phase oxidation depends solely on the reaction temperature, it is necessary to control the reaction temperature constant within the above range according to the desired saturation magnetization. Here, a constant reaction temperature means a given temperature ±5° C. The reaction temperature fluctuation beyond the ±5° C. limits hampers to obtain the magnetic metal particles having the desired saturation magnetization.

A retention time in the reactor, i.e., the time (thermal gas-phase oxidation time) from supply of granulated material to be stabilized onto the belt in the reactor to exit of the stabilized material from the outlet, is normally 1 to 20 hours, preferably 1.5 to 18 hours, depending on the above various conditions. The thermal gas-phase oxidation times of shorter than 1 hour and those of longer than 20 hours are undesirable because the stabilization is insufficient in the former case and because the production efficiency is low, though there are no problems in magnetic metal particle quality in the latter case. In the present invention, the thermal gas-phase oxidation is carried out for a given period of the retention time, as described above, and a substantially stationary thermal gas-phase oxidation is possible. For this reason, there is no mutual collision of particles or dust generation, and contact between the material to be stabilized and oxygen-containing gas is good, so that the magnetic metal particles having a uniform oxidized layer and excellent magnetic properties can be produced.

This retention time can be generally adjusted by changing the belt running speed by controlling the driving motor, etc.

The above-mentioned production method of the present invention enables a continuous mass-production, on an industrial scale at a high efficiency, of the magnetic metal particles having a uniform oxidized layer thereon and excellent magnetic properties.

By the use of the production method and production apparatus of the present invention, substantially stationary reduction of a material to be reduced on a belt is possible, and mutual collision of particles and dust generation are prevented. Besides, contact between the material and a reducing gas is good, and deformation of aciculae and mutual sintering of the skeleton particles due to the influence of formed steam can be avoided, thereby making it possible to produce the magnetic metal particles of excellent magnetic properties.

Also, in the stabilization process, a substantially stationary thermal gas-phase oxidation of a material to be stabilized is possible on a belt with no mutual collision of particles or dust generation, and also contact between the material and an oxygen-containing gas is good. Therefore, the magnetic metal particles having a uniform oxidized layer and excellent magnetic properties can be produced.

Moreover, the use of production method and production apparatus of the present invention enables a continuous mass-production, on an industrial scale at a high efficiency, of such high quality magnetic metal particles.

Since each of the reduction and stabilization processes has unique effects as described above, the present invention can be carried out by any one of the following embodiments:
(1) the reduction is carried out by the reduction process of the present invention, while stabilization is by a conventional method;
(2) the reduction is carried out by a conventional method, while stabilization is by the stabilization process of the present invention; and
(3) the reduction process of the present invention and the stabilization process of the present invention are combined, with a preference given to the embodiment of term (3) above.

Figure 5:
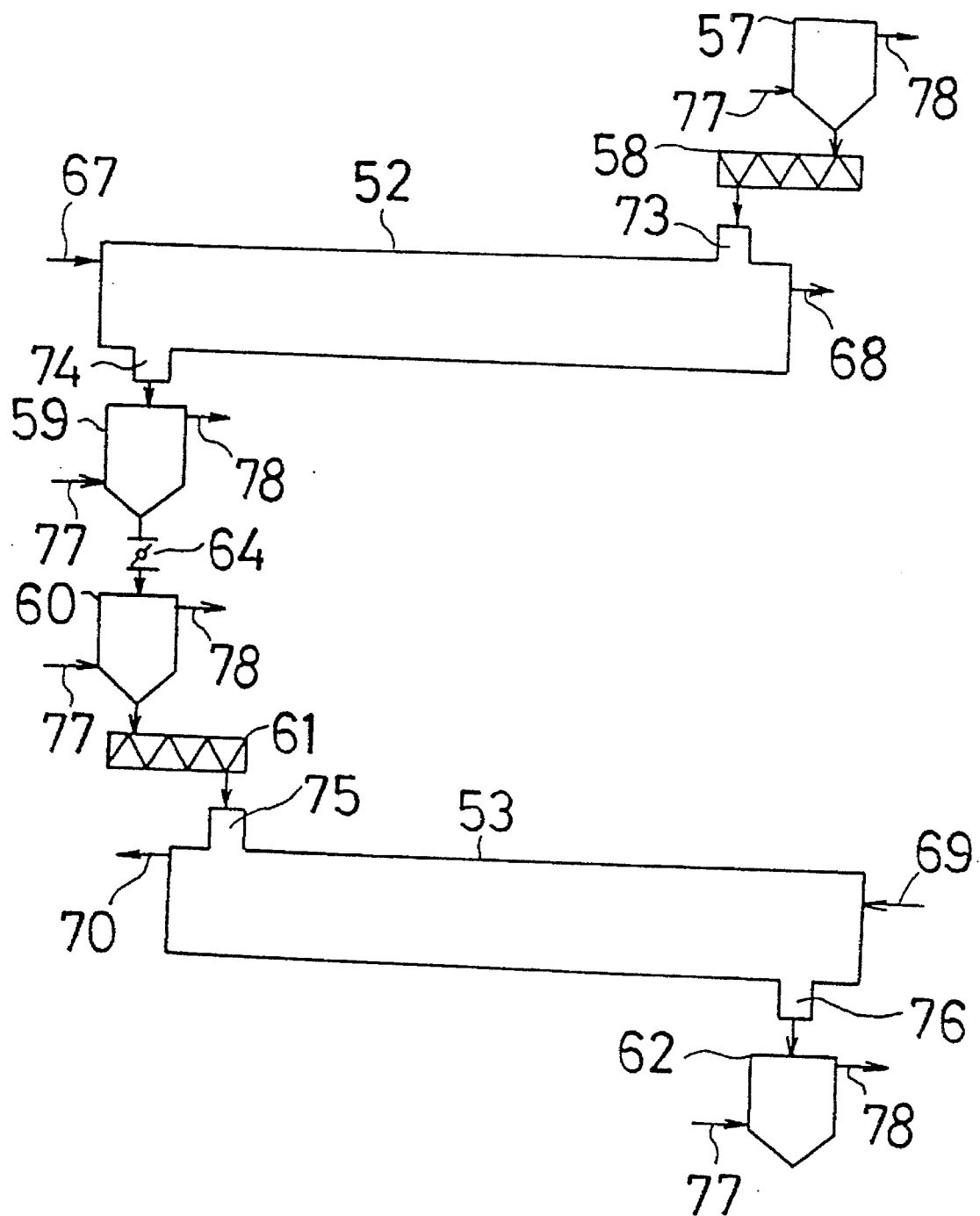
FIG. 5 is a schematic illustration of the production apparatus in which the reduction process is connected to the stabilization process.

Such embodiment (3) is hereinafter described in more detail. FIG. 5 is a schematic illustration of an example of an apparatus suitable for the production for the magnetic metal particles according to embodiment (3).

As illustrated in FIG. 5, the production apparatus of the present invention is constructed with a series of a thermal reduction reactor 52 and a thermal gas-phase oxidation reactor 53 which are arranged in this order and connected to each other via a material transport means. An inlet 73 for a material to be reduced of the thermal reduction reactor 52 is directly connected with a material transport means such as a material feeder 58 for continuously supplying the material in a material hopper 57 onto the mesh belt in the reactor. Similarly, an inlet 75 for a material to be stabilized of the thermal gas-phase oxidation reactor 53 is directly connected with a material feeder 61. The material feeder may be any one of various known forms of feeders such as screw feeders, rotary feeders and gate type feeders.

To the outlets 74 and 76 for a treated material of each reactor are connected product hoppers 59 and 62, respectively, for recovering the treated material. The reduced material is supplied from this product hopper 59 to a material hopper 60 via a material supply valve 64. Also, to avoid a direct contact of the gas, the material to be treated and the treated material with the atmosphere, and to avoid mutual mixing of gases flowing in the reactors, these material hoppers 57 and 60 and these product hoppers 59 and 62 are purged with a nitrogen gas.

The method for the production of the magnetic metal particles according to embodiment (3) using such a production apparatus is hereinafter described. In this embodiment, iron compound particles based on iron oxyhydroxide or iron oxide are granulated to a material to be reduced having a weight-average size of 1 to 20 mm. This granulated material is treated by the following processes (a) and (b), using a gas flow reactor having a gas-passable belt.

Process (a): The granulated material to be reduced is continuously supplied onto a gas-passable belt installed in a closed gas flow reactor, and the material being transported is continuously thermally reduced with a reducing gas to yield a reduced material.

Process (b): The reduced material (i.e. granulated material to be stabilized) obtained in process (a) above is continuously supplied onto a gas-passable belt installed in a gas flow reactor, and the material being transported is continuously stabilized by a thermal gas-phase oxidation with an oxygen-containing gas.

The treatment conditions, etc. in the respective processes are the same as those for the reduction and stabilization processes described above of the present invention.

The raw material used in the reduction process of the present invention is iron compound particles based on iron oxyhydroxide or iron oxide. When iron oxide is used for the reduction process, it can be prepared by thermally dehydrating iron oxyhydroxide. In the present invention, the magnetic metal particles can be continuously produced at a high efficiency by conducting such thermal dehydration using the same gas flow reactor with a gas-passable belt as those used in the above-described reduction and stabilization processes.

Specifically, in another embodiment, the present invention provides a method for the production of magnetic metal particles based on metallic iron, which comprises the following processes (a)-(c):

(a) continuously supplying the granulated material to be dehydrated of iron compound particles based on iron oxyhydroxide, which have a weight-average size of 1 to 20 mm, onto a gas-passable belt installed in a gas flow reactor; and continuously conducting the thermal dehydration with a non-reducing gas while conveying the material to continuously yield a thermally dehydrated material;

(b) continuously supplying the thermally dehydrated material obtained in process (a) above onto a gas-passable belt installed in a closed gas flow reactor; and continuously conducting the thermal reduction with a reducing gas while conveying the material to continuously yield a reduced material; and (c) continuously supplying the reduced material obtained in process (b) above onto a gas-passable belt installed in a gas flow reactor; and continuously stabilizing the material by the thermal gas-phase oxidation with an oxygen-containing gas while conveying the material.

The present invention also provides a production apparatus for magnetic metal particles which comprises a thermal dehydration apparatus wherein granulated iron compound particles based on iron oxyhydroxide are thermally dehydrated; a thermal reduction apparatus wherein the thermally dehydrated material obtained by the above thermal dehydration apparatus is thermally reduced; and a thermal gas-phase oxidation apparatus wherein the thermally reduced material obtained by the above thermal reduction apparatus is stabilized by the thermal gas-phase oxidation. These apparatuses are arranged in series in the order of the thermal dehydration apparatus, the thermal reduction apparatus and the thermal gas-phase oxidation apparatus, and each of apparatuses is connected via a material transport means. Each apparatus comprises a gas flow reactor having an inlet and outlet for a gas, an inlet for a material to be treated, and an outlet for a treated material; a belt conveyor having a gas-passable belt for transporting the material to be treated which is installed in the reactor; a gas dispersion plate for uniformly dispersing and supplying the gas introduced via the gas inlet to the surface of the belt on which the material is placed; and a heating means arranged to heat the inside of the above reactor.

The gas flow reactor used in the thermal dehydration process can be substantially structurally the same as those used in the above-described gas flow reactors for the reduction and stabilization processes. In this process, a non-reducing gas is used in place of a reducing gas or an oxygen-containing gas. The non-reducing gas used in the present invention is not subject to limitation, as long as it does not have a reducing ability, and air or inert gas is exemplified. Such inert gas includes $N_2$, He, Ne, Ar and $CO_2$, which may be used singly or in combination.

Varying depending on a granulated material size, the non-reducing gas flow rate is preferably not lower than 2 cm/sec, more preferably not lower than 10 cm/sec and not higher than 100 cm/sec as of linear gas velocity in the ascending direction at a right angle to the belt surface. The linear gas velocity is as obtained at the thermal dehydration temperature. When the linear gas velocity is lower than 2 cm/sec, the partial pressure of the steam formed upon the dehydration reaction increases, and the size of the crystallite of the iron oxide constituting the acicular skeleton particles becomes too large, resulting in deformation of the acicular shape and mutual sintering of the skeleton particles, and the magnetic properties of the obtained magnetic metal particles are deteriorated.

The layer thickness of the granulated material on the belt is normally not greater than 30 cm, preferably not greater than 25 cm. Excess layer thicknesses is undesirable because deformation of the acicular shape of the skeleton particles of the thermally dehydrated material in the upper portion of the layer occurs due to the thermal dehydration with the non-reducing gas containing more steam formed in the lower portion of the layer, resulting in deterioration of the magnetic properties of the finally obtained magnetic metal particles.

The thermal dehydration temperature is preferably 350° to 700° C., more preferably 400° to 650° C. The dehydration temperatures of under 350° C. are undesirable because dehydration pores created in the skeleton particles upon dehydration are not closed, resulting in deterioration of the magnetic properties of the finally obtained magnetic metal particles. The dehydration temperatures exceeding 700° C. are undesirable because the acicular shape of the skeleton particles collapses, resulting in deteriorated magnetic properties.

A retention time in the thermal dehydration reactor, i.e., the time (thermal dehydration time) from supply of the granulated raw material onto the belt in the reactor to exit of the treated material (thermally dehydrated material) from the outlet, is normally 0.5 to 5 hours, preferably 0.5 to 2 hours, depending on the above various conditions. Thermal dehydration times shorter than 0.5 hours and those longer than 5 hours are undesirable because dehydration is insufficient in the former case and because production efficiency is low, though there is no problem in magnetic metal particle quality, in the latter case. In the present invention, the thermal dehydration is carried out for a given period of retention time, as described above, and a substantially stationary thermal dehydration is possible. For this reason, there is no mutual collision of particles or dust generation, and contact between the granulated material to be treated and a non-reducing gas is good, so that a uniform thermal dehydration can be performed.

Such retention time can be adjusted by changing the belt running speed by controlling the driving motor etc.

Figure 6:
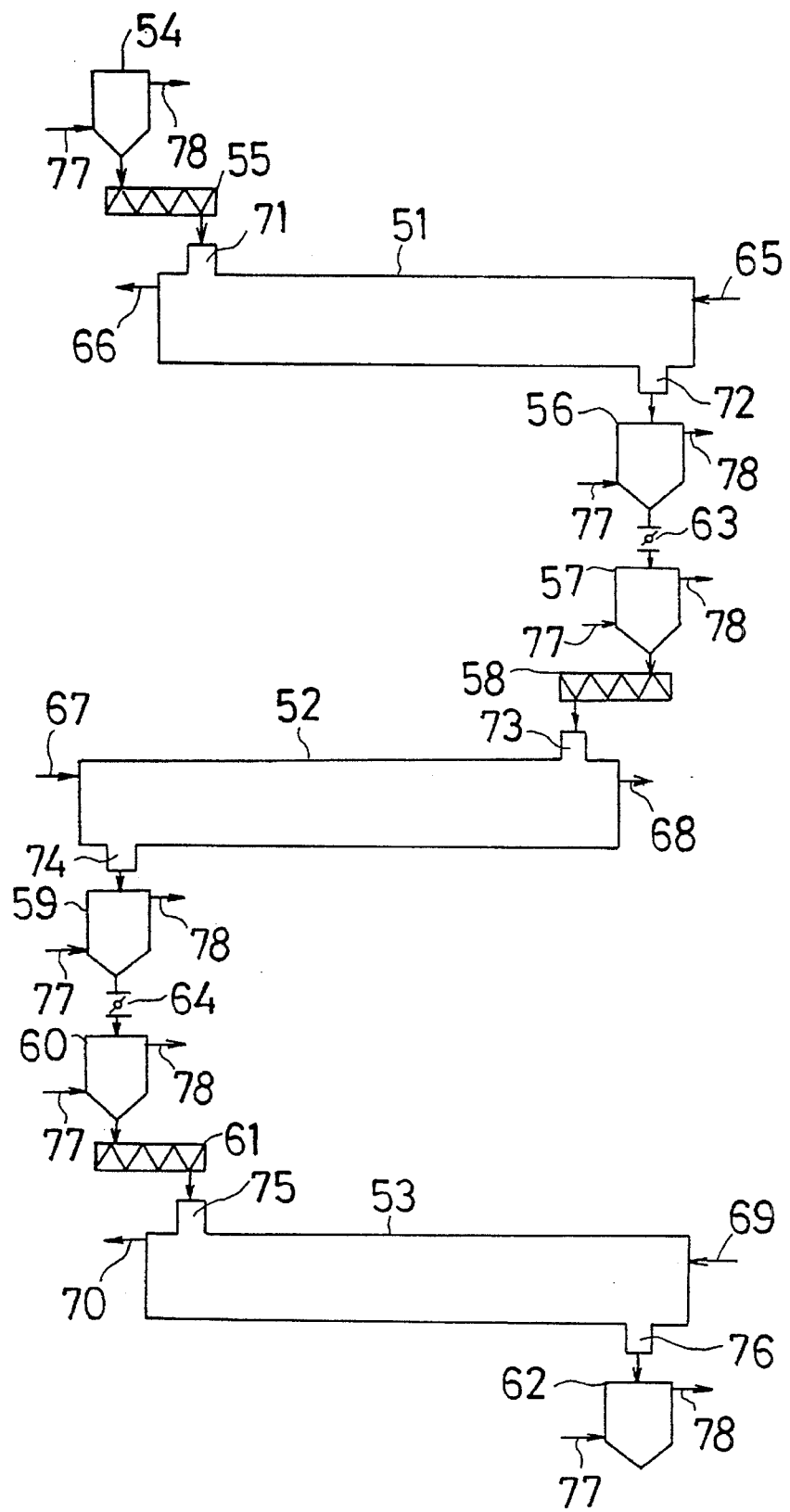
FIG. 6 is a schematic illustration of the production apparatus in which the dehydration, reduction and stabilization processes are serially connected in this order.

FIG. 6 is a schematic illustration of an example of an apparatus suitable for the production of magnetic metal particles, which involves a thermal dehydration process.

As illustrated in FIG. 6, the production apparatus of the present invention is characterized to be constructed with a series of a thermal dehydration reactor 51, a thermal reduction reactor 52 and a thermal gas-phase oxidation reactor 53 which are arranged in this order and connected via material transport means.

An inlet 71 for a material to be dehydrated of the thermal dehydration reactor 51 is directly connected with a material transport means such as a material feeder 55 for continuously supplying the material in a material hopper 54 onto the mesh belt in the reactor. Similarly, an inlet 73 for a material to be reduced of the thermal reduction reactor 52 is directly connected with a material feeder 58; and an inlet 75 for a material to be stabilized of the thermal gas-phase oxidation reactor 53 is directly connected with a material feeder 61. The material feeder may be any one of various known forms of feeders such as screw feeders, rotary feeders and gate type feeders.

To product outlets 72, 74 and 76 of each reactor, product hoppers 56, 59 and 62 are connected, respectively, for recovering the treated materials. Thermally dehydrated material supply from the product hopper 56 to the material hopper 57, and reduced material supply from the product hopper 59 to the material hopper 60 are carried out by material supply valves 63 and 64, respectively.

Also, to avoid direct contact with the atmosphere of the gas, the material to be treated and the treated material, and to avoid mutual mixing of gases flowing in the reactors, these material hoppers 54, 57 and 60 and product hoppers 56, 59 and 62 are purged with a nitrogen gas.

EXAMPLES

The present invention is hereinafter described in more details by means of the following working examples, but the present invention is not limited by them.

Example 1

Example of Apparatus for Reduction Process

Figure 2:
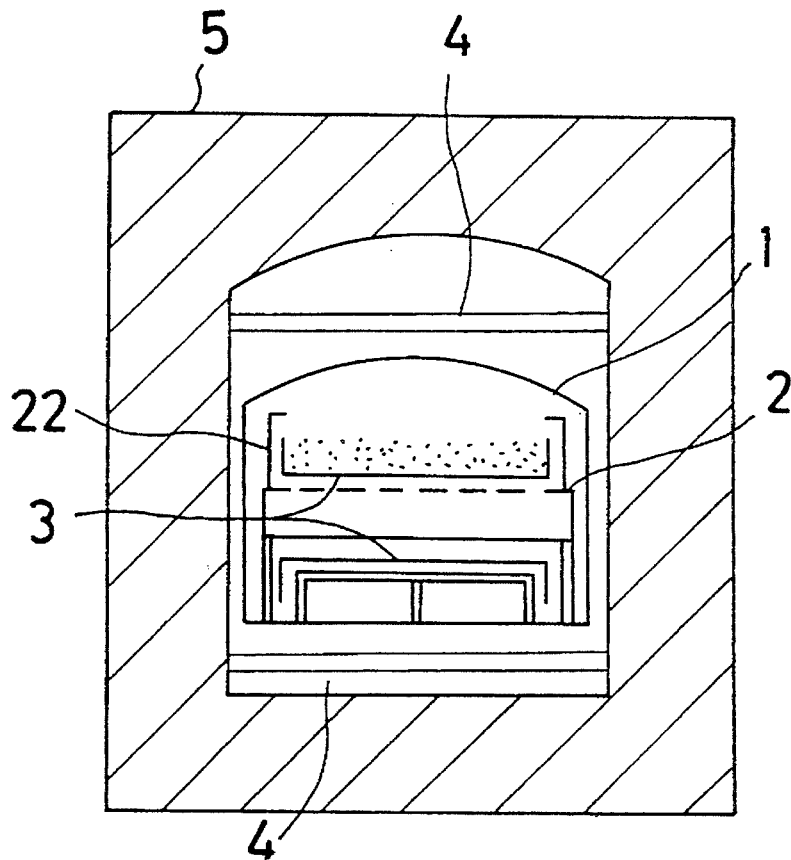
FIG. 2 is a sectional view taken along line II—II of FIG. 1.
Figure 3:
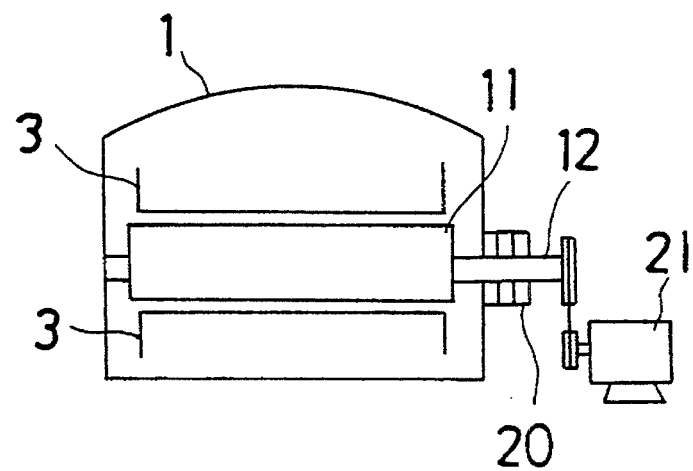
FIG. 3 is a sectional view taken along line III—III of FIG. 1.

FIG. 1 is a longitudinal sectional view of an example of an apparatus suitable for the reduction process of the present invention. FIGS. 2 and 3 are partial sectional views of the production apparatus.

The size of a reactor 1 is 370 mm in width, 300 mm in height and 2900 mm in length. Heating is achieved with an electric furnace constructed with an electric heater 4 and a heat insulating material 5.

A belt 3 is a stainless steel endless mesh belt (mesh opening size 0.15 mm) having a width of an 300 mm and an effective reduction length of 2000 mm. This belt has a sectional shape illustrated in FIG. 3 to prevent a granulated material to be reduced from dropping from belt edges. The belt is driven to run at a constant speed in the direction of arrow A in FIG. 1 by a belt driving roller 11 and a driving motor 21 provided outside the reactor. A roller driving shaft 12 is equipped with a shaft seal 20 for sealing against a reducing gas.

A gas dispersion plate 2 is a perforated plate having a section of 300×300 mm. Five units of this gas dispersion plate are serially provided under a mesh belt on which the granulated material to be reduced is placed. Also, as illustrated in FIG. 2, a gas seal wall 22 is provided so that the reducing gas coming from the gas dispersion plate flows efficiently through the belt without flowing along the sides of the belt.

An inlet 8 for a material to be reduced of the reactor is directly connected with a material feeder 13 for continuously supplying the granulated material to be reduced in a material hopper 14 onto the mesh belt. The material feeder is a screw feeder. Also, a thickness adjusting plate 10, provided to make the granulated material supplied onto the mesh belt have a given layer thickness on the mesh belt, has an adjustment mechanism allowing layer thickness change. Layer thickness can be adjusted by regulating the rotation speed of the material feeder 13 to change the feeding speed of the material and by changing the thickness setting of the thickness adjusting plate 10. The granulated material thus made to have a given layer thickness is transported in the direction of arrow A in FIG. 1 by the belt. While being transported, the granulated material comes in contact with the reducing gas introduced into the reactor 1 via an inlet 6 for a gas and jetted out from the gas dispersion plate, so that the material is continuously reduced. The retention time of the material (time from the material supply onto the belt in the reactor to the exit of the reduced material from an outlet 9), i.e., the reduction time, can be adjusted by a belt running speed. To appropriately control this belt running speed, the above-described driving motor 21 has a mechanism capable of variably controlling the motor rotation speed. To recover the magnetic metal particles obtained after a given reduction time, a product hopper 15 is connected to the outlet 9. Also, to avoid a direct contact of the reducing gas and the reduced material with the atmosphere, the material hopper 14 and the product hopper 15 are purged with a nitrogen gas.

Example 2

Example of Production

The granulated material to be reduced used is a pellet having a weight-average size of 3 mm prepared by extruding granulation of acicular α-FeOOH particles containing 4% by weight of Al relative to Fe. The primary particle size is 0.22 μm in major axis length and 10 in axial ratio. This granulated material is reduced with a hydrogen gas at 480° C., using the production apparatus described in Example 1. The hydrogen gas is supplied at a linear gas velocity of 40 cm/sec in the ascending direction at a right angle to the mesh belt surface.

After being packed in a material hopper 14, the granulated material to be reduced is continuously supplied into the reactor, inside of which is previously heated to a reduction temperature, at a rate of 6 kg/hr, using a material feeder 13. The layer thickness of the material on the mesh belt is set at 10 cm by a thickness adjusting plate 10. While the material is transported by the belt in the direction of arrow A, it is continuously reduced in contact with the hydrogen gas flowing through the mesh belt. The retention time of the material in the reactor is set at 3 hr by adjusting belt running speed by a belt driving motor 21 provided outside the reactor.

Under the above-described setting conditions, the magnetic metal particles are obtained in a hopper for a treated material at 3.7 kg/hr. A portion of the magnetic metal particles is immersed in toluene and then air-dried in the atmosphere to oxidize the surface thereof, after which its magnetic properties and size of the metallic iron crystallite are determined, using a vibrated sample magnetometer (VSM, To-ei Kogyo Kabushiki Kaisha) and an X-ray diffraction analyzer (Rigaku Denki Kabushiki Kaisha), respectively. The size of the metallic iron crystallite is calculated from the half-value width of the iron (110) diffraction peak, using Scherrer's equation.

The magnetic metal particles are found to have a coercivity (Hc) of 1610 Oe, a saturation magnetization ($\sigma s$) of 142 emu/g, a squareness ratio ($\sigma r/\sigma s$, wherein or is a remanent magnetization) of 0.52 [–] and a size of the metallic iron crystallite of 176 angstroms, indicating excellent magnetic properties.

Example 3

Example of Production

The same conditions as those in Example 2 are employed except that a granulated material to be reduced is prepared from acicular $\alpha$-$Fe_2O_3$ particles containing 3% by weight of Si relative to Fe. The primary particle size is 0.25 μm in major axis length and 10 in axial ratio. The granulated material is reduced at 500° C.

As a result, the magnetic metal particles are obtained in a treated material hopper at 4.2 kg/hr. The magnetic properties of the magnetic metal particles are found to be a coercivity (Hc) of 1580 Oe, a saturation magnetization ($\sigma s$) of 148 emu/g, a squareness ratio ($\sigma r/\sigma s$) of 0.51 [–] and a size of the metallic iron crystallite of 170 angstroms, indicating excellent magnetic properties.

Example 4

Example of Apparatus for Stabilization Process

An apparatus having a construction similar to that of the apparatus used in Example 1 is used for the stabilization process. This apparatus is hereinafter described with reference to FIGS. 1, 2 and 3.

FIG. 1 is a longitudinal sectional view of an example of an apparatus suitable for the stabilization process of the present invention. FIGS. 2 and 3 are partial sectional views of the production apparatus.

The size of a reactor 1 is 390 mm in width, 620 mm in height and 3900 mm in length. Heating is achieved with an electric furnace constructed with an electric heater 4 and a heat insulating material 5.

A belt 3 is a stainless steel endless mesh belt (mesh opening size 0.15 mm) having a width of 300 mm and an effective thermal gas-phase oxidation length of 3000 mm. This belt has a sectional shape illustrated in FIG. 3 to prevent a granulated material to be stabilized from dropping from the belt edges. The belt is driven to run at a constant speed in the direction of arrow A in FIG. 1 by a belt driving roller 11 and a driving motor 21 provided outside the reactor. A roller driving shaft 12 is equipped with a shaft seal 20 for sealing against an oxygen-containing gas.

A gas dispersion plate 2 is a perforated plate having a section of 800×800 mm. Eight units of this gas dispersion plate are serially provided under a mesh belt on which the granulated material to be stabilized is placed. Also, as illustrated in FIG. 2, a gas seal wall 22 is provided so that the oxygen-containing gas coming from the gas dispersion plate flows efficiently through the belt without flowing along the sides of the belt.

An inlet 8 for a material to be stabilized of the reactor is directly connected with a material feeder 13 for continuously supplying the granulated material to be stabilized in a material hopper 14 onto the mesh belt. The material feeder is a screw feeder. Also, a thickness adjusting plate 10, provided to make the granulated material supplied onto the mesh belt have a given layer thickness on the mesh belt, has an adjustment mechanism allowing layer thickness change. Layer thickness can be adjusted by regulating the rotation speed of the material feeder 13 to change the feeding speed of the material and by changing the thickness setting of the thickness adjusting plate 10. The granulated material thus made to have a given layer thickness is transported in the direction of arrow A in FIG. 1 by the belt. While being transported, the material to be stabilized comes in contact with the oxygen-containing gas introduced into the reactor 1 via an inlet 6 for an oxygen-containing gas and jetted out from the gas dispersion plate, so that the material is continuously stabilized by a thermal gas-phase oxidation. The retention time of the material (time from the material supply onto the belt in the reactor to the exit of the stabilized material from an outlet 9), i.e., the thermal gas-phase oxidation time, can be adjusted by belt running speed. To appropriately control this belt running speed, the above-described driving motor 21 has a mechanism capable of variably controlling the motor rotation speed. To recover the magnetic metal particles obtained after a given thermal gas-phase oxidation time, a product hopper 15 is connected to the outlet 9. Also, to avoid a direct contact of the oxygen-containing gas and the stabilized material with the atmosphere, the material hopper 14 and the product hopper 15 are purged with a nitrogen gas.

Example 5

Example of Production

The magnetic metal particles having a weight-average size of 2.7 mm obtained in Example 2 are used as a granulated material to be stabilized. This material is then stabilized at 70° C. by a thermal gas-phase oxidation with an air-nitrogen mixing gas containing 500 ppm oxygen using the production apparatus described in Example 4.

The above-mentioned oxygen-containing gas is supplied at a linear gas velocity of 35 cm/sec in the ascending direction at a right angle to the mesh belt surface.

After being packed in the material hopper 14 in the manner of avoiding exposure to the atmosphere, the granulated material to be stabilized is continuously supplied into the reactor, inside of which is previously heated to a thermal gas-phase oxidation temperature, at a rate of 5.5 kg/hr, using the material feeder 13. The layer thickness of the material on the mesh belt is set at 15 cm by the thickness adjusting plate 10. While the material is transported by the belt in the direction of arrow A, it is continuously stabilized by the thermal gas-phase oxidation in contact with the oxygen-containing gas flowing through the mesh belt. Retention time of the material in the reactor is set at 8 hr by adjusting belt running speed by the belt driving motor 21 provided outside the reactor.

Under the above-described setting conditions, the magnetic metal particles are obtained in the product hopper at 6.1 kg/hr. The magnetic properties of these magnetic metal particles are determined using a vibrated sample magnetometer (VSM). The saturation magnetization retention is also determined after the magnetic metal particles are allowed to stand for 1 week under an oxidative conditions where the temperature is 60° C. and the relative humidity is 90%.

As a result, the magnetic metal particles are found to have a coercivity (Hc) of 1575 Oe, a saturation magnetization ($\sigma s$) of 129 emu/g, a squareness ratio ($\sigma r/\sigma s$) of 0.52 [–] and a saturation magnetization retention of 82%, indicating excellent magnetic properties.

Example 6

Example of Production

The same conditions as those in Example 5 are employed except that the magnetic metal particles having a weight-average size of 2.7 mm obtained in Example 3 are used as a granulated material to be stabilized.

As a result, the stabilized magnetic metal particles are obtained at 6.0 kg/hr. The magnetic metal particles are found to have a coercivity (Hc) of 1550 Oe, a saturation magnetization ($\sigma s$) of 133 emu/g, a Squareness ratio ($\sigma r/\sigma s$) of 0.51 [–] and a saturation magnetization retention of 82%, indicating excellent magnetic properties.

Example 7

Example of Apparatus

As illustrated in FIG. 6, the production apparatus of the present Example is constructed with a series of a thermal dehydration reactor 51, a thermal reduction reactor 52 and a thermal gas-phase oxidation reactor 53 which are connected to each other via material supplying valves. The same gas flow reactor as that used in Example 1 is used as the thermal dehydration reactor 51 except for the reactor 1 being 390 mm in width, 620 mm in height and 1900 mm in length; belt 3 being 300 mm in width and 1000 mm in effective thermal dehydration length; and 3 units of the gas dispersion plate 2 having a section of 300×300 mm being provided in series. The gas flow reactor of Example 1 is used as the thermal reduction reactor 52. The gas flow reactor of Example 4 is used as the thermal gas-phase oxidation reactor 53.

An inlet 71 for a material to be dehydrated (granulated raw material) of the thermal dehydration reactor 51 is directly connected with a material feeder 55 for continuously supplying the material in a material hopper 54 onto the mesh belt in the reactor. Similarly, an inlet 73 for a material to be reduced of the thermal reduction reactor 52 is directly connected with a material feeder 58, and an inlet 75 for a material to be stabilized of the thermal gas-phase oxidation reactor 53, a material feeder 61. These material feeders are screw feeders.

Treated material outlets of each reactor, 72, 74 and 76, are connected with product hoppers 56, 59 and 62, respectively, for recovering the treated materials. Material supply valves 63 and 64 are provided between the product hopper 56 and the material hopper 57 and between the product hopper 59 and the material hopper 60, respectively.

Also, these material hoppers 54, 57 and 60 and the product hoppers 56, 59 and 62 are purged with a nitrogen gas.

Example 8

Example of Production

The starting material is a granulated material having a weight-average size of 3 mm prepared by extruding granulation of acicular α-FeOOH particles containing 4% by weight of Al relative to Fe. The primary particle size is 0.22 μm in major axis length and 10 in axial ratio. This granulated material is treated in the following steps (a), (b) and (c) under conditions stated below using the production apparatus described in Example 7:

Step (a): The thermal dehydration is conducted at 500° C. using a nitrogen gas as a non-reducing gas. The nitrogen gas is supplied at a linear gas velocity of 8 cm/sec in the ascending direction at a right angle to the mesh belt surface.

After being packed in the material hopper 54, the above-described granulated material is continuously supplied at a rate of 8.5 kg/hr, using a material feeder 55 to the reactor, inside of which has been heated to a thermal dehydration temperature. The layer thickness of the granulated material on the mesh belt is set at 14 cm by the thickness adjusting plate. While the granulated material on the mesh belt is transported by the belt in the direction of arrow A shown in FIG. 1, it is continuously thermally dehydrated in contact with the nitrogen gas flowing through the mesh belt. Retention time of the granulated material in the reactor is set at 1.5 hours by adjusting the belt running speed by the belt driving motor provided outside the reactor.

Under the above-described setting conditions, a thermally dehydrated material is obtained in the product hopper 56 at 7.4 kg/hr, which is continuously supplied into the material hopper 57 via the material supply valve 63.

Step (b): The thermal reduction is conducted at 480° C. using a hydrogen gas as a reducing gas. The hydrogen gas is supplied at a linear gas velocity of 50 cm/sec in the ascending direction at a right angle to the mesh belt surface.

The above-described thermally dehydrated material in the material hopper 57 is continuously supplied at a rate of 7.4 kg/hr, using a material feeder 58 to the reactor, inside of which has been heated to a thermal reduction temperature. The layer thickness of the thermally dehydrated material on the mesh belt is set at 12 cm by the thickness adjusting plate. While the thermally dehydrated material on the mesh belt is transported by the belt in the direction of arrow A shown in FIG. 1, it is continuously thermally reduced in contact with the hydrogen gas flowing through the mesh belt. Retention time of the thermally dehydrated material in the reactor is set at 3.0 hours by adjusting the belt running speed by the belt driving motor provided outside the reactor.

Under the above-described setting conditions, a reduced material is obtained in the product hopper 59 at 5.3 kg/hr, which is continuously supplied into the material hopper 60 via the material supply valve 64.

A portion of this reduced material is immersed in toluene and then air-dried in the atmosphere, after which its magnetic properties are determined, using a vibrated sample magnetometer (VSM). The obtained reduced material is found to have a coercivity (Hc) of 1600 Oe, a saturation magnetization ($\sigma s$) of 141 emu/g and a squareness ratio ($\sigma r/\sigma s$) of 0.52 [–].

Step (c): The thermal gas-phase oxidation is conducted at 70° C. using an air-nitrogen mixing gas containing 500 ppm oxygen as an oxygen-containing gas. The oxygen-containing gas is supplied at a linear gas velocity of 35 cm/sec in the ascending direction at a right angle to the mesh belt surface.

The above-described reduced material in the material hopper 60 is continuously supplied at a rate of 5.3 kg/hr, using the material feeder 61 to the reactor, inside of which has been heated to a thermal gas-phase oxidation temperature. The layer thickness of the reduced material on the mesh belt is set at 17 cm by the thickness adjusting plate. While the reduced material on the mesh belt is transported by the belt in the direction of arrow A shown in FIG. 1, it is continuously stabilized by the thermal gas-phase oxidation in contact with the above-described oxygen-containing gas flowing through the mesh belt. Retention time of the reduced material in the reactor is set at 9.0 hr by adjusting the belt running speed by the belt driving motor provided outside the reactor.

Under the above-described setting conditions, the magnetic metal particles are obtained in the product hopper 62 at 5.8 kg/hr.

The obtained magnetic metal particles are found to have a coercivity (Hc) of 1565 Oe, a saturation magnetization ($\sigma s$) of 128 emu/g a squareness ratio ($\sigma r/\sigma s$) of 0.52 [–], a saturation magnetization retention of 82% and a size of the metallic iron crystallite of 165 angstroms, indicating excellent magnetic properties.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing magnetic metal particles wherein iron compound particles based on iron oxyhydroxide or iron oxide are thermally reduced with a reducing gas, comprising the steps of providing a closed gas flow reactor wholly enclosing a gas-passable conveying belt; continuously supplying a granulated material to be reduced onto the belt; and continuously thermally reducing the granulated material using said reducing gas while conveying said granulated material substantially in a stationary state, the reducing gas being supplied at a linear gas velocity not lower than 10 cm/sec in the ascending direction at a right angle to a belt surface, such that within the reactor said granulated material is substantially prevented from exposure to an oxidizing environment.

2. The method according to claim 1, wherein a weight-average size of said granulated material to be reduced is not smaller than 1 mm and not greater than 20 mm.

3. The method according to claim 1, wherein said reducing gas is one member selected from the group consisting of a pure hydrogen gas, a CO gas, and their mixtures with inert components.

4. The method according to claim 1 wherein said granulated material to be reduced is supplied in a layer thickness of not greater than 25 cm.

5. The method according to claim 1, wherein the thermal reduction is undertaken at a reduction temperature of not lower than 300° and not higher than 700°.

6. The method according to claim 1, wherein the reactor further wholly encloses at least one dispersion plate for uniformly dispersing and supplying the reducing gas to a surface of the belt on which the granulated material to be reduced is supplied.

7. The method according to claim 6, wherein said gas dispersion plate is arranged between an upper side surface of the belt on which the granulated material to be reduced is supplied, and a lower side surface of the belt.

8. The method according to claim 1, wherein the layer thickness of the granulated material to be reduced on the belt is not greater than 20 cm.

9. The method according to claim 1, wherein said linear gas velocity is not lower than 30 cm/sec.

10. A method for producing magnetic metal particles, wherein iron compound particles based on iron oxyhydroxide or iron oxide are thermally reduced with a reducing gas, and then stabilized by a thermal gas-phase oxidation with an oxygen-containing gas, comprising the following steps (a) and (b):

(a) continuously obtaining a reduced material by providing a closed gas flow reactor wholly enclosing a gas-passable conveying belt, continuously supplying a granulated material to be reduced onto the belt for a thermal reduction, and continuously conducting thermally reducing the granulated material using said reducing gas while conveying substantially in a stationary state the granulated material to be reduced, such that within the reactor said granulated material is substantially prevented from exposure to an oxidizing environment; and (b) continuously stabilizing the reduced granulated material obtained in step (a) by continuously supplying the granulated material onto a gas-passable belt installed in a gas flow reactor for stabilization, and continuously conducting the thermal gas-phase oxidation with the oxygen-containing gas while conveying the granulated material.

11. A method for producing magnetic metal particles, wherein iron compound particles based on iron oxyhydroxide are thermally dehydrated with a non-reducing gas, then thermally reduced with a reducing gas, and further stabilized by a thermal gas-phase oxidation with an oxygen-containing gas, comprising the following steps (a)–(c):

(a) continuously supplying a granulated material of the iron compound particles based on iron oxyhydroxide, which have a weight-average size of 1 to 20 mm, onto a gas-passable belt installed in a gas flow reactor for the thermal dehydration; and continuously conducting the thermal dehydration with the non-reducing gas while conveying the granulated material so as to continuously yield a thermally dehydrated material;

(b) continuously supplying the thermally dehydrated material obtained in step (a) by providing a closed gas flow reactor wholly enclosing a gas-passable conveying belt onto which the dehydrated material is supplied for the thermal reduction; and continuously thermally reducing the dehydrated material using said reducing gas while conveying the dehydrated material so as to continuously yield a reduced material, such that within the reactor said granulated material is substantially prevented from exposure to an oxidizing environment; and (c) continuously supplying the reduced material obtained in step (b) onto a gas-passable belt installed in a gas flow reactor for stabilization; and continuously stabilizing the material by the thermal gas-phase oxidation with the oxygen-containing gas while conveying the material.

* * * * *